(12) United States Patent
Kwon et al.

(10) Patent No.: US 12,158,632 B2
(45) Date of Patent: Dec. 3, 2024

(54) CAMERA MODULE

(71) Applicant: Samsung Electro-Mechanics Co., Ltd., Suwon-si (KR)

(72) Inventors: Oh Byoung Kwon, Suwon-si (KR); Jong Woo Hong, Suwon-si (KR); Gab Yong Kim, Suwon-si (KR); Ki Hoon Jang, Suwon-si (KR); Bo Sung Seo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 294 days.

(21) Appl. No.: 17/227,563

(22) Filed: Apr. 12, 2021

(65) Prior Publication Data

US 2021/0405321 A1 Dec. 30, 2021

(30) Foreign Application Priority Data

Jun. 26, 2020 (KR) .................. 10-2020-0078764
Nov. 5, 2020 (KR) .................. 10-2020-0146886

(51) Int. Cl.
*G02B 7/09* (2021.01)
*G02B 27/64* (2006.01)
(Continued)

(52) U.S. Cl.
CPC ............. *G02B 7/09* (2013.01); *G02B 27/646* (2013.01); *G03B 5/00* (2013.01); *G03B 13/36* (2013.01);
(Continued)

(58) Field of Classification Search
CPC ........ G02B 7/09; G02B 27/646; G02B 7/022; G02B 13/001; G02B 27/642; G02B 7/02;
(Continued)

(56) References Cited

U.S. PATENT DOCUMENTS 9,804,477 B2 10/2017 Bang et al.
10,197,891 B2 2/2019 Rho et al.
(Continued)

FOREIGN PATENT DOCUMENTS

CN 106791291 A 5/2017
CN 107786795 A 3/2018
(Continued)

OTHER PUBLICATIONS

English translation of JP2010128387, (2010) (Year: 2010).*
(Continued)

*Primary Examiner* — Thomas K Pham
*Assistant Examiner* — Kuei-Jen L Edenfield
(74) *Attorney, Agent, or Firm* — NSIP Law (57) ABSTRACT

A camera module is provided. The camera module includes a lens module; a carrier coupled to the lens module, and configured to rotate using an optical axis as a rotation axis; a housing configured to accommodate and support the carrier; and a guide unit disposed between the carrier and the housing, wherein the guide unit includes a ball member that is configured to perform a rolling movement between the carrier and the housing, and a first substrate connected to the lens module, wherein at least a portion of the first substrate is configured to bend as the carrier is rotated.

20 Claims, 10 Drawing Sheets

(51) Int. Cl.
*G03B 5/00* (2021.01)
*G03B 13/36* (2021.01)
*G03B 30/00* (2021.01)

(52) U.S. Cl.
CPC ...... *G03B 30/00* (2021.01); *G03B 2205/0007* (2013.01)

(58) Field of Classification Search
CPC .......... G02B 27/64; G02B 13/00; G03B 5/00; G03B 13/36; G03B 30/00; G03B 2205/0007; G03B 2205/0061; G03B 2205/0069; G03B 3/10; G03B 17/12; G03B 17/04; H04N 5/225; H04N 101/00; H04N 5/232
USPC .................................. 359/694–706, 811–830
See application file for complete search history.

(56) References Cited

U.S. PATENT DOCUMENTS

| | | | |
|---|---|---|---|
| 10,948,736 | B2 | 3/2021 | Minamisawa et al. |
| 2016/0142635 | A1 | 5/2016 | Kaneko et al. |
| 2017/0146889 | A1 | 5/2017 | Bang et al. |
| 2018/0059512 | A1 | 3/2018 | Rho et al. |
| 2018/0120674 | A1* | 5/2018 | Avivi ................. G03B 3/10 |
| 2019/0018258 | A1 | 1/2019 | Minamisawa et al. |
| 2020/0292841 | A1 | 9/2020 | Sakae et al. |
| 2022/0221734 | A1* | 7/2022 | Kim ................. H04N 23/00 |

FOREIGN PATENT DOCUMENTS

| | | | |
|---|---|---|---|
| CN | 109254475 A | | 1/2019 |
| JP | 2003-116028 A | | 4/2003 |
| JP | 2010-128387 A | | 6/2010 |
| JP | 2010128387 | * | 6/2010 |
| KR | 10-2017-0059783 A | | 5/2017 |
| KR | 10-2018-0022367 A | | 3/2018 |
| KR | 10-2019-0007388 | | 1/2019 |
| KR | 10-2020-0001243 A | | 1/2020 |
| KR | 10-2020-0056988 A | | 5/2020 |
| WO | WO 2017/164432 A1 | | 9/2017 |

OTHER PUBLICATIONS

Korean Office Action issued on Mar. 4, 2022, in the counterpart Korean Patent Application No. 10-2020-0146886. (7 pages in English and 5 pages in Korean).

Chinese Office Action issued on Nov. 29, 2022, in counterpart Chinese Patent Application No. 202110689986.8 (8 pages in English, 9 pages in Korean).

Chinese Office Action issued on Jun. 10, 2023, in counterpart Chinese Patent Application No. 202110689986.8 (3 pages in English, 5 pages in Chinese).

* cited by examiner

CAMERA MODULE

CROSS-REFERENCE TO RELATED APPLICATION(S)

This application claims the benefit under 35 USC § 119(a) of Korean Patent Application No. 10-2020-0078764 filed on Jun. 26, 2020, and Korean Patent Application No. 10-2020-0146886 filed on Nov. 5, 2020 in the Korean Intellectual Property Office, the entire disclosures of which are incorporated herein by reference for all purposes.

BACKGROUND

1. Field

The following description relates to a camera module.

2. Description of Related Art

Recently, camera modules have been routinely provided in portable electronic devices such as smartphones, tablet personal computers (PCs) and laptop computers, and have added functions such as autofocusing (AF) and optical image stabilization (OIS).

Additionally, the camera module may have an actuator that moves a lens module in a direction perpendicular to an optical axis to stabilize an optical image.

However, there may be a limit to an amount of optical image stabilization when the lens module is moved in the direction perpendicular to the optical axis to stabilize the optical image. In particular, it may be difficult to precisely stabilize the optical image when the lens module is continuously unstable, such as when capturing a moving image.

Additionally, when a subject to be captured moves when capturing a moving image thereof, it may be inconvenient, since a user may have to directly move the portable electronic device to adjust a capturing direction of the camera module to the moving subject.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a camera module includes a lens module; a carrier, coupled to the lens module, and configured to rotate using an optical axis as a rotation axis; a housing, configured to accommodate and support the carrier; and a guide unit, disposed between the carrier and the housing, wherein the guide unit includes a ball member that is configured to perform a rolling movement between the carrier and the housing, and a first substrate, connected to the lens module, wherein at least a portion of the first substrate is configured to bend as the carrier is rotated.

The guide unit may further include a first guide groove disposed in the carrier, and a second guide groove disposed in the housing, and the ball member is disposed between the first guide groove and the second guide groove, and wherein at least one of the first guide groove and the second guide groove has a rounded shape and has a length in a rotation direction of the carrier using the optical axis as a rotation axis.

A plurality of guide units may be provided, and the plurality of guide units may be disposed on an arc of a circle centered on the optical axis.

At least one of the first guide groove and the second guide groove may include a barrier that protrudes from each of opposite ends of the at least one of the first guide groove and the second guide groove.

A protrusion may be disposed on one of the carrier and the housing, a groove in which the protrusion may be disposed is disposed in the other of the carrier and the housing, and a rotation range of the carrier may be limited by the protrusion and the groove.

The camera module may further include a driving unit, configured to provide a driving force to the carrier, wherein the driving unit comprises a magnet disposed on the carrier, a coil configured to face the magnet in an optical axis direction, and a second substrate on which the coil is disposed and which is fixed to the housing.

The magnet may be configured to have an inner surface that faces the optical axis, and an outer surface opposing the inner surface, each surface having a rounded shape.

An inscribed circle in contact with the inner surface of the magnet and a circumscribed circle in contact with the outer surface of the magnet may be concentric circles.

The driving unit may further include a frame fixed to the second substrate, and the coil may be wound around the frame.

A yoke member composed of a magnetic material may be disposed in the frame, wherein a first portion of the yoke member may be disposed in the frame, and a second portion of the yoke member is disposed to be exposed externally from the frame, and wherein the magnet and the yoke member may be configured to face each other in the optical axis direction.

A sensing magnet may be disposed on the carrier, and a position sensor that is configured to face the sensing magnet may be disposed in the housing.

A portion of the first substrate may extend from an internal space of the housing to an external space of the housing, wherein a second substrate may be disposed to surround at least three of outer surfaces of the housing, and wherein the first substrate and the second substrate are connected to each other on one of the at least three outer surfaces of the housing.

A support member composed of a metal may be disposed on the carrier, and wherein a first portion of the support member may be disposed on an inner surface of the carrier, and a second portion of the support member is disposed to be exposed externally from the carrier.

The lens module may include a lens portion, a base configured to accommodate the lens portion, and an image sensor module coupled to the base, and wherein the first substrate may be configured to have a first side connected to the image sensor module and a second side coupled to the housing.

The first substrate may be disposed to extend from an internal space of the carrier to a space between the housing and the carrier, and may be disposed to extend from the space between the housing and the carrier to an external space of the housing.

A first through groove may be disposed in the carrier, and the first substrate may be configured to extend from the internal space of the carrier to the space between the housing and the carrier through the first through groove, and wherein a second through groove may be disposed in the housing, and the first substrate may be configured to extend from the space between the housing and the carrier to the external space of the housing through the second through groove.

A connection substrate may be disposed on a bottom of the housing, and wherein the first substrate may be electrically connected to the connection substrate.

In a general aspect, an electronic device includes a camera module, including a housing; a carrier, disposed in the housing, and configured to rotate relative to the housing; a guide unit, disposed between the carrier and the housing, wherein the guide unit includes a ball member that is configured to perform a rolling movement between the carrier and the housing, a lens module, coupled to the carrier, and configured to rotate with the carrier using the optical axis as a rotation axis, and a first substrate, connected to the lens module; wherein at least a portion of the first substrate is configured to bend as the carrier is rotated.

The first substrate may be configured to externally transmit a signal from an image sensor connected to the lens module.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Figure 1:
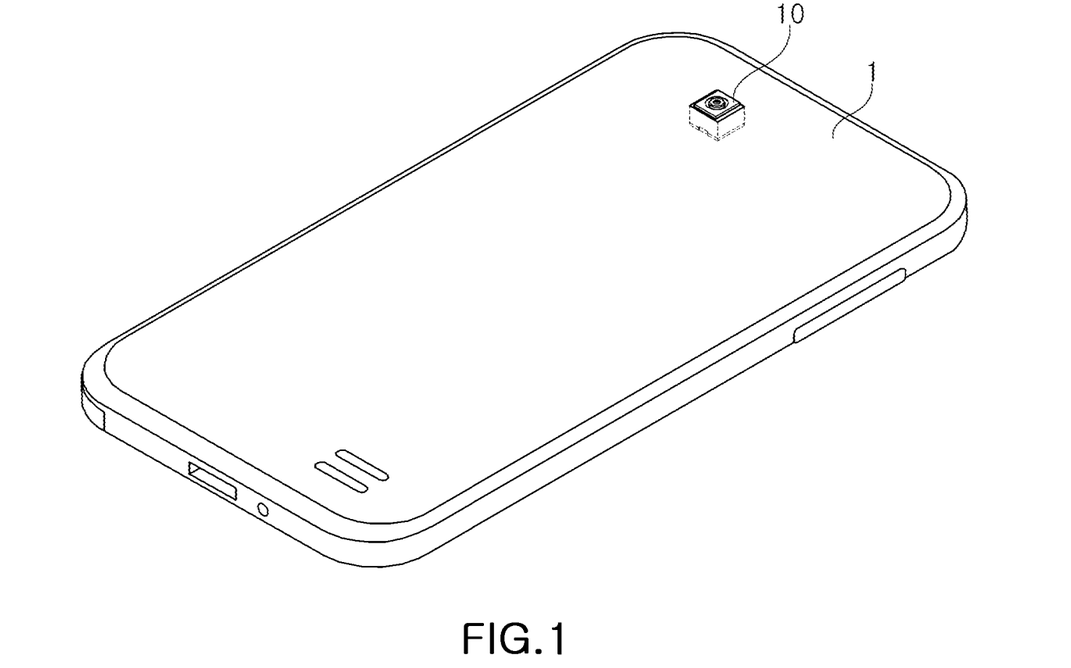
FIG. 1 is a perspective view of an example portable electronic device, in accordance with one or more embodiments.
Figure 2:
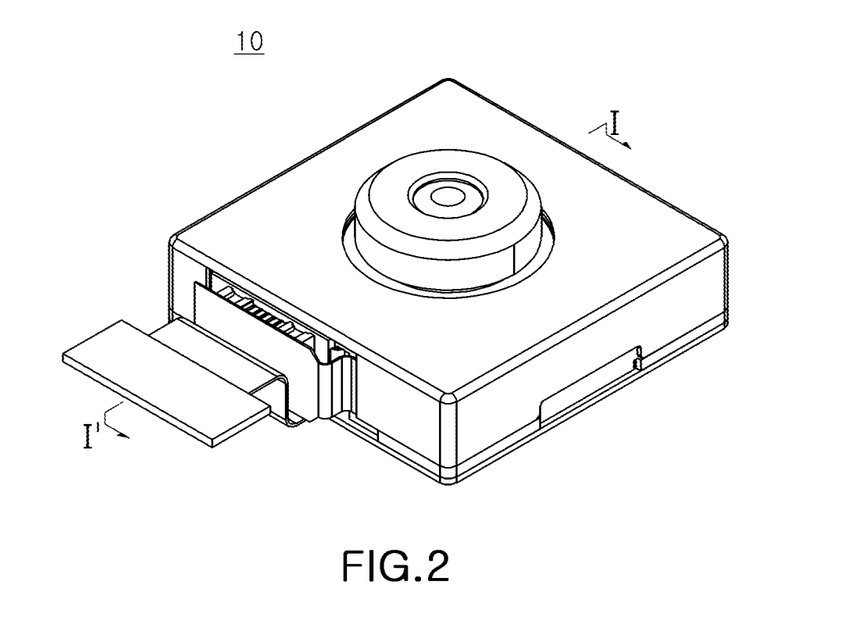
FIG. 2 is a perspective view of an example camera module, in accordance with one or more embodiments.

FIG. 1 is a perspective view of an example portable electronic device, in accordance with one or more embodiments; and FIG. 2 is a perspective view of an example camera module, in accordance with one or more embodiments.

Referring to FIG. 1, a portable electronic device 1 may be, as non-limiting examples, a portable electronic device such as a mobile communications terminal, a smartphone or a tablet personal computer (PC).

As shown in FIG. 1, a camera module 10 may be mounted on the portable electronic device 1 to image a subject.

The camera module 10, in accordance with one or more embodiments, may be rotated using an optical axis (Z-axis) as a rotation axis thereof. In an example, a lens and an image sensor disposed in the camera module 10 may be rotated together.

Therefore, when an optical image is unstable during image capturing, it is possible to capture a clear still image or a clear moving image by stabilizing the unstable optical image.

When the lens or the image sensor is horizontally moved to stabilize the optical image, there may be a limit to an amount of movements thereof, and there may thus be a limit to an amount of optical image stabilization. In particular, it may be difficult to precisely stabilize the optical image when the optical image is continuously unstable, such as when a moving image is being captured.

However, the camera module 10, in accordance with one or more embodiments, may rotate the lens and the image sensor together using the optical axis (Z-axis) as rotation axes thereof, thereby easily stabilizing the optical image during its capturing.

In an example, a subject of interest may move when a still image or a moving image is captured, and the camera module 10 may thus be rotated using the optical axis (Z-axis) as a rotation axis thereof to capture a movement of the subject of interest.

In an example, the camera module 10 may rotate and move a lens module 200 by tracking a movement of the subject of interest.

In an example, the lens module 200 disposed in the camera module 10 may be rotated based on the optical axis (Z-axis).

Additionally, the lens module 200 may be rotated based on the optical axis (Z-axis) to stabilize the optical image which may be unstable during the image capturing process.

When rotated using the optical axis (Z-axis) as a rotation axis thereof, the lens module 200 may have a range of the rotation angles of ±10°.

Figure 3:
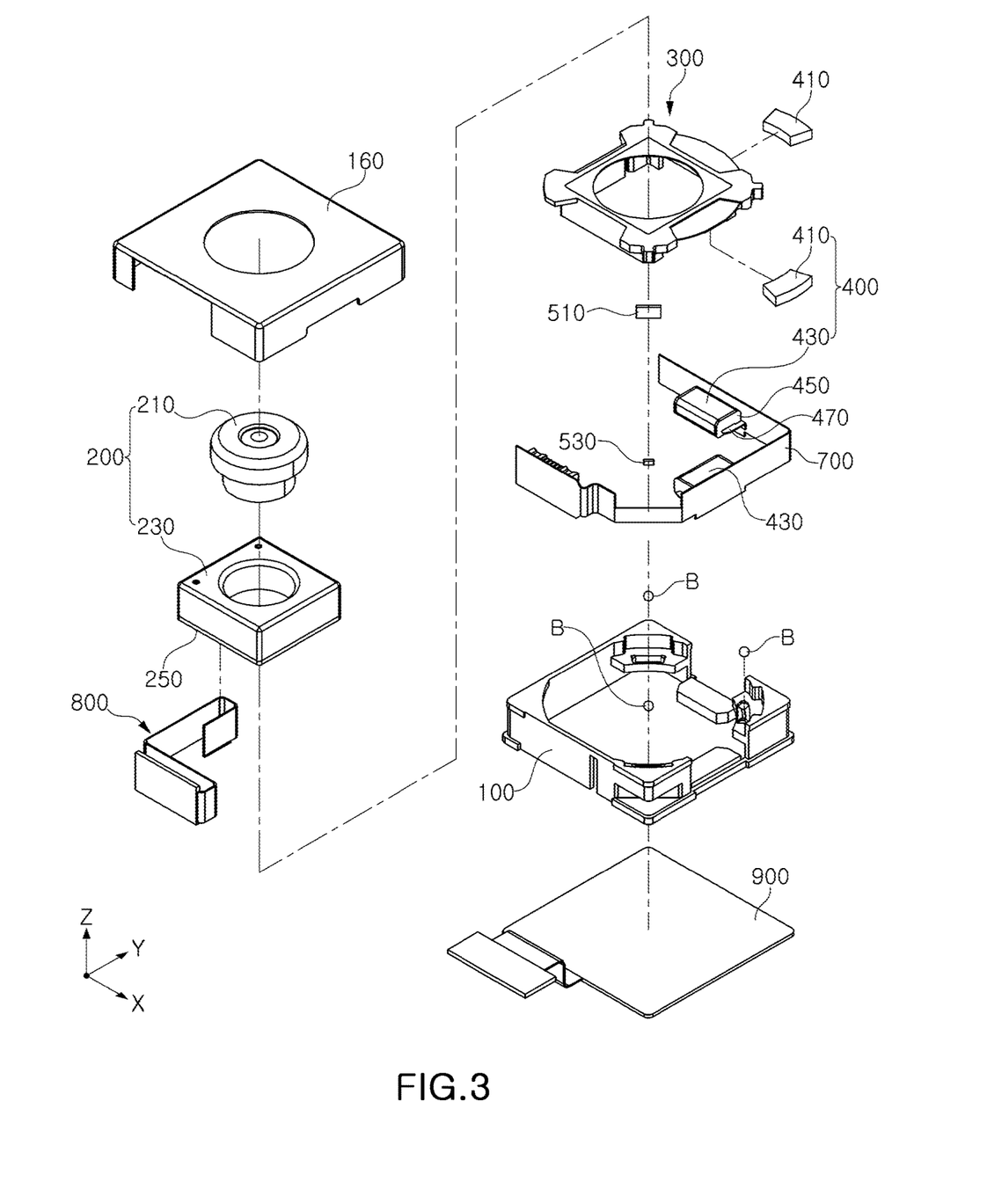
FIG. 3 is an exploded perspective view of the example camera module, in accordance with one or more embodiments.
Figure 4:
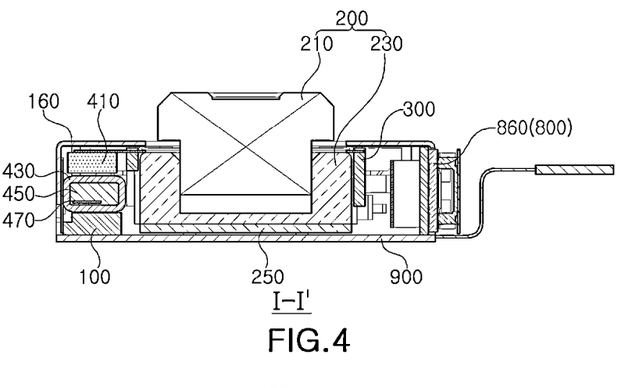
FIG. 4 is a cross-sectional view taken along line I-I' of FIG. 2.

FIG. 3 is an exploded perspective view of an example camera module, in accordance with one or more embodiments; and FIG. 4 is a cross-sectional view taken along line I-I' of FIG. 2.

Referring to FIGS. 3 and 4, the camera module 10, in accordance with one or more embodiments may include the lens module 200, a carrier 300, a housing 100 and a case 160.

The lens module 200 may be accommodated in the carrier 300, and the carrier 300 may be accommodated in the housing 100.

The housing 100 and the case 160 may be fixtures.

The carrier 300 may be rotated using the optical axis (Z-axis) as a rotation axis thereof. The lens module 200 may be accommodated in the carrier 300, and the lens module 200 may thus be rotated together with the carrier 300 using the optical axis (Z-axis) as the rotation axis.

The lens module 200 may include a lens portion 210 and a base 230. The lens portion 210 may be a lens barrel, but is not limited to the lens barrel. In an example, the lens portion 210 may refer to a shape or structure in which the lens barrel and a holder are coupled to each other.

At least one lens that captures the subject may be accommodated in the lens portion 210. When a plurality of lenses are disposed in the lens portion 210, the plurality of lenses are mounted in the lens portion 210 along the optical axis (Z-axis).

The lens portion 210 may be accommodated in the base 230. In an example, the base 230 may have an open top and an open bottom, and the lens portion 210 may be accommodated in an internal space of the base 230.

The lens module 200 may further include an image sensor module 250 disposed on the bottom of the base 230.

The image sensor module 250 is a device that converts light incident through the lens module 210 into an electrical signal.

In an example, the image sensor module 250 may include an image sensor and a printed circuit board connected to the image sensor, and may further include an infrared filter.

The infrared filter may block light in an infrared region from the light incident through the lens module.

The image sensor may convert the light incident through the lens portion 210 into the electrical signal. In a non-limiting example, the image sensor may be a charge coupled device (CCD) or a complementary metal-oxide semiconductor (CMOS).

The electrical signal converted by the image sensor may be output as an image through a display unit of the portable electronic device 1.

The image sensor may be fixed to the printed circuit board and electrically connected to the printed circuit board by wire bonding.

In an example, the lens portion 210 may be moved in an optical axis (Z-axis) direction. In an example, the lens portion 210 may be moved relative to the base 230 in the optical axis (Z-axis) direction.

That is, the lens portion 210 may be moved relative to the base 230 in the optical axis (Z-axis) direction to perform an autofocusing process.

Either an actuator including a magnet and a coil or a piezoelectric actuator may be used to move the lens portion 210 in the optical axis (Z-axis) direction. In an example, the magnet may be disposed in the lens portion 210, and the coil may be disposed in the base 230.

Therefore, the lens portion 210 may be moved relative to the base 230 in the optical axis (Z-axis) direction by a driving force of the actuator.

Additionally, the lens module 200 may be rotated using the optical axis (Z-axis) as a rotation axis thereof, and the lens portion 210 included in the lens module 200 may thus be rotated using the optical axis (Z-axis) as a rotation axis thereof while being moved relative to the base 230 in the optical axis (Z-axis) direction.

The lens module 200 may be coupled to the carrier 300. The carrier 300 may have a shape of a box having an open top and an open bottom. The lens module 200 may be fixed to the carrier 300 by, as only an example, an adhesive or the like.

The carrier 300 may then be accommodated in the housing 100. The housing 100 may have a shape of a box having an open top and an open bottom.

The carrier 300 may be rotated (rolled) relative to the housing 100 using the optical axis (Z-axis) as a rotation axis thereof. The lens module 200 may be coupled to the carrier 300, and as the carrier 300 is rotated, the lens module 200 may thus also be rotated based on the optical axis (Z-axis) together with the carrier 300.

In an example, a first substrate 800 may be connected to the lens module 200 to allow a signal from the image sensor to be externally transmitted. The first substrate 800 may be connected to the rotatable lens module 200, and at least one portion of the first substrate 800 may be made flexible.

The case 160 may be coupled to the housing 100 to cover the housing 100. Additionally, a connection substrate 900 may be coupled to the bottom of the housing 100. The connection substrate 900 may be connected to the portable electronic device 1.

Figure 5:
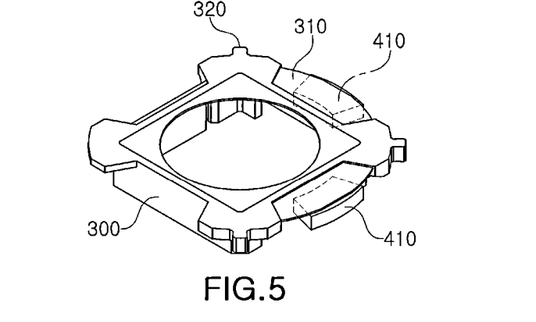
FIG. 5 is a perspective view of an example carrier, in accordance with one or more embodiments.
Figure 6:
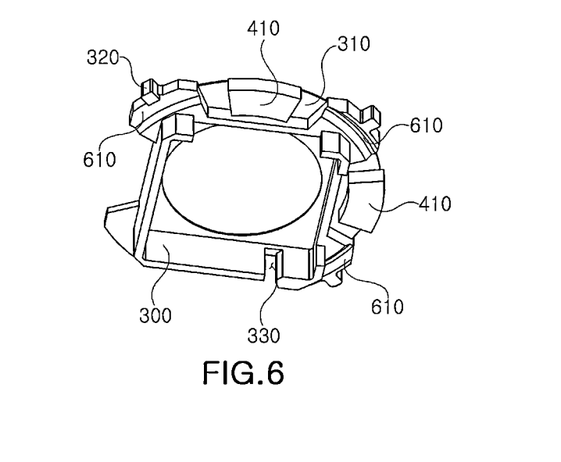
FIG. 6 is a bottom perspective view of the example carrier, in accordance with one or more embodiments.

FIG. 5 is a perspective view of a carrier; and FIG. 6 is a bottom perspective view of the carrier.

Figure 7:
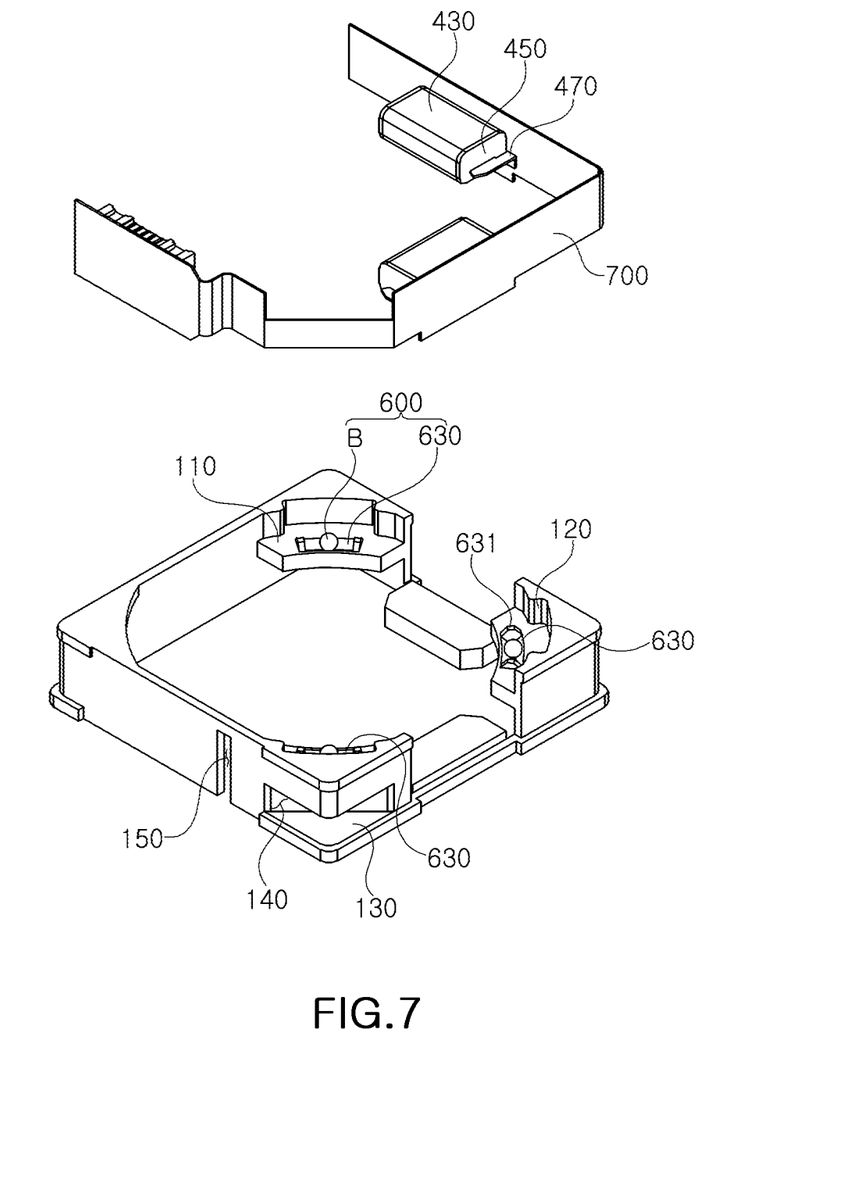
FIG. 7 is a perspective view of an example housing and a second substrate, in accordance with one or more embodiments.
Figure 8:
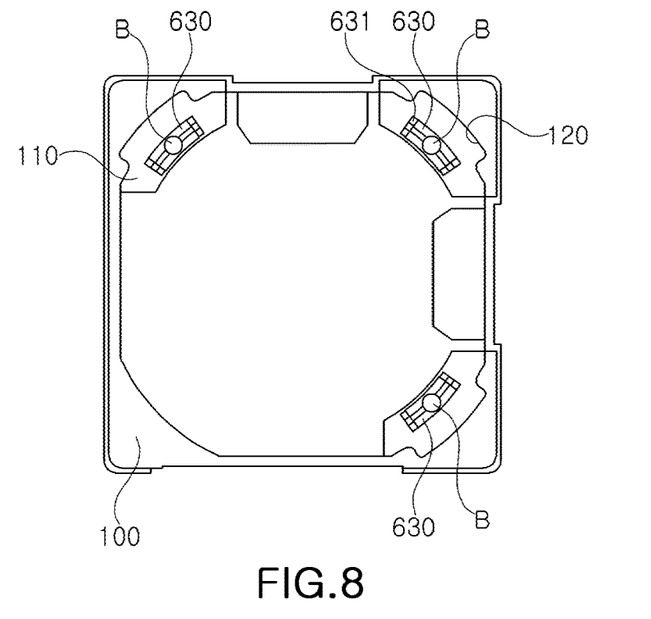
FIG. 8 is a plan view of the example housing.

Additionally, FIG. 7 is a perspective view of a housing and a second substrate; and FIG. 8 is a plan view of the housing.

Figure 9:
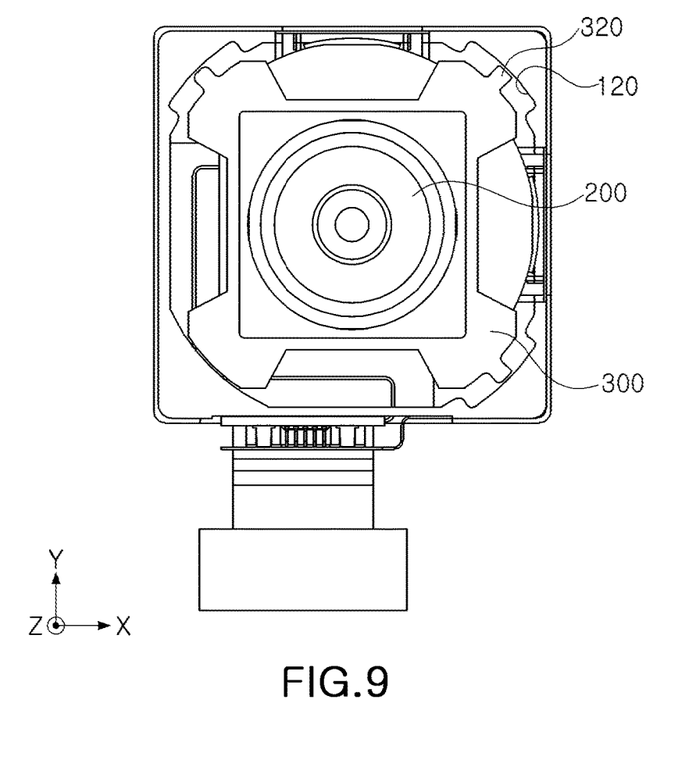
FIG. 9 is a plan view of an example camera module from which a case is removed.
Figure 10:
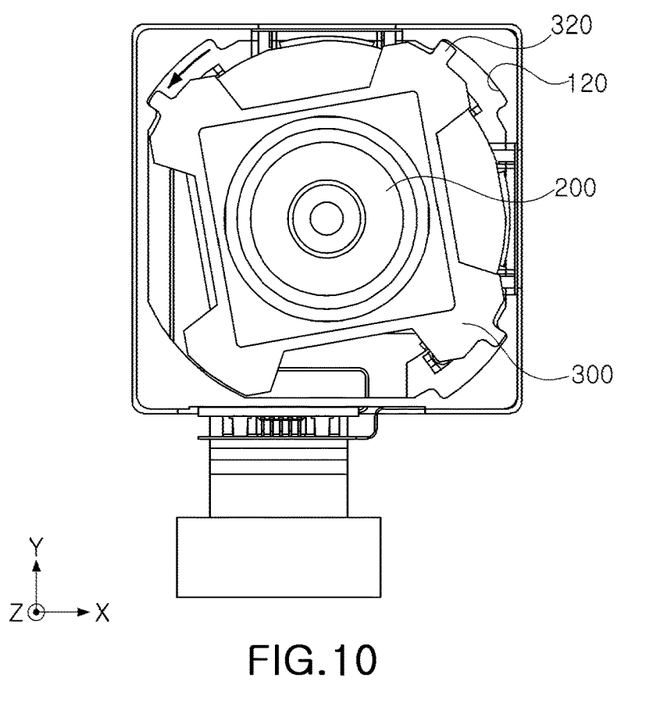
FIGS. 10 and 11 are views illustrating a state in which a lens module and the carrier are rotated together using an optical axis as rotation axes thereof.
Figure 11:
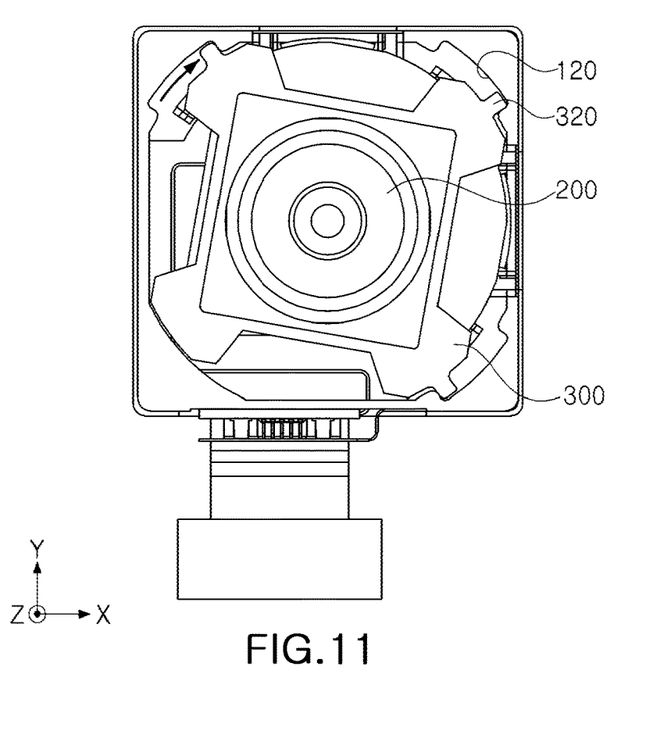

Additionally, FIG. 9 is a plan view of the camera module from which a case is removed; and FIGS. 10 and 11 are views illustrating a state in which a lens module and the carrier are rotated together using an optical axis as rotation axes thereof.

Figure 12:
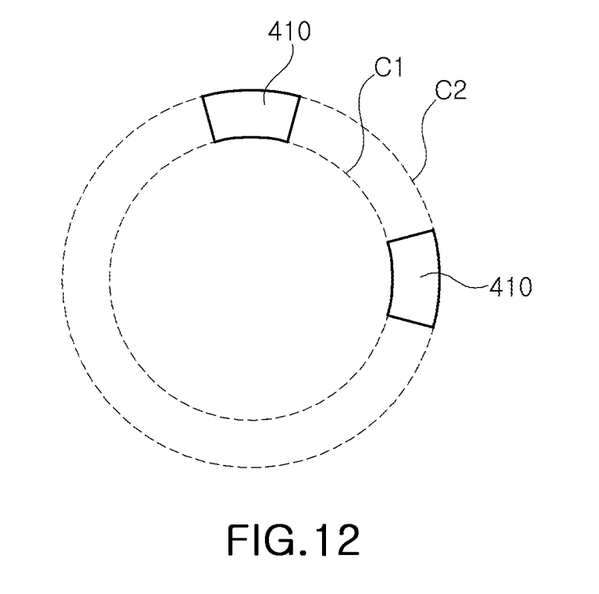
FIG. 12 is a plan view of an example magnet, in accordance with one or more embodiments.
Figure 13:
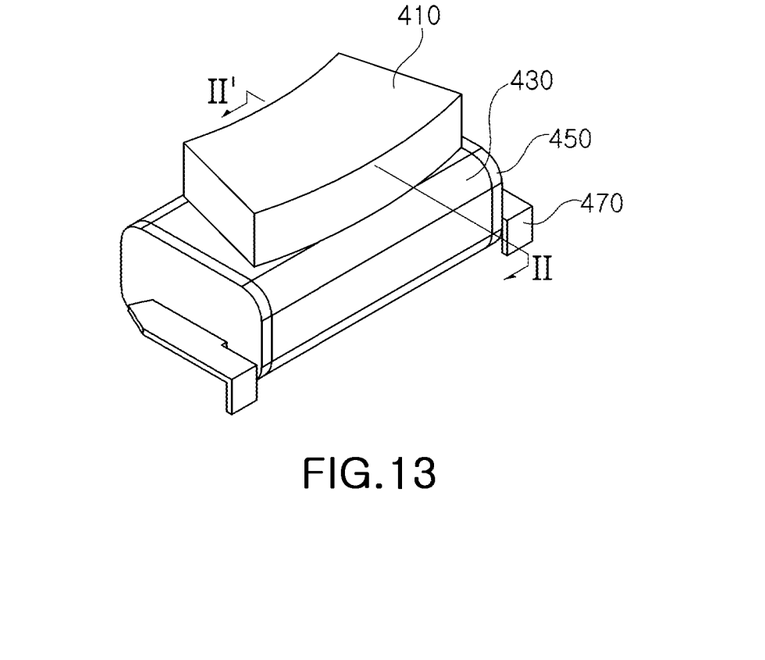
FIG. 13 is a schematic perspective view of an example driving unit, in accordance with one or more embodiments.
Figure 14:
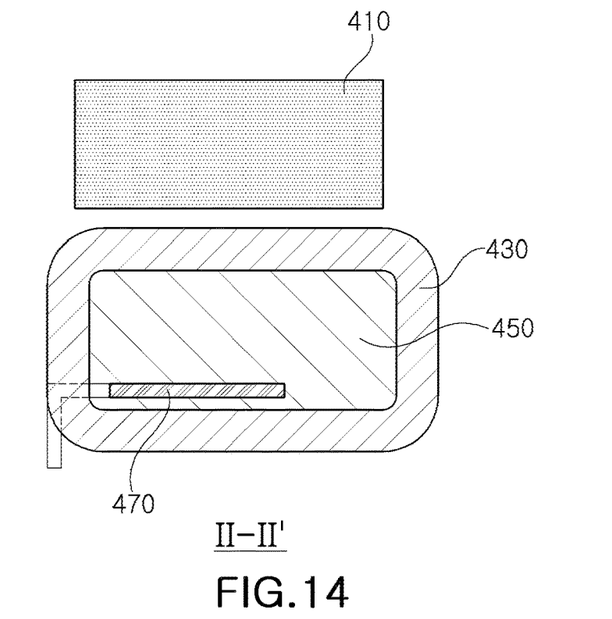
FIG. 14 is a cross-sectional view taken along line II-II' of FIG. 13.

Additionally, FIG. 12 is a plan view of a magnet; FIG. 13 is a schematic perspective view of a driving unit; and FIG. 14 is a cross-sectional view taken along line II-II' of FIG. 13.

Referring to FIGS. 5 through 14, the carrier 300 may be accommodated in the housing 100, and may be disposed to be rotatable relative to the housing 100. In an example, the carrier 300 may be rotated using the optical axis (Z-axis) as a rotation axis thereof.

The lens module 200 may be accommodated in the carrier 300, and the lens module 200 may be rotated together with the carrier 300.

A guide unit 600 that supports the rotation of the carrier 300 may be disposed between the carrier 300 and the housing 100.

The guide unit 600 may include a guide groove portion and a ball member B. The guide groove portion may include a first guide groove 610 (FIG. 6) disposed in the carrier 300, and a second guide groove 630 (FIG. 7) disposed in the housing 100, and the ball member B may include a plurality of balls. In a non-limiting example, the ball member B may include three balls. However, the ball member B is not limited to this number of the balls, and may include at least three balls, or more than three balls.

In an example in which the ball member B includes three balls, each ball may be disposed in three corner regions of the housing 100.

The ball member B may be disposed between the first guide groove 610 and the second guide groove 630.

A support member 310 may be disposed on the carrier 300. In an example, a first portion of the support member 310 may be disposed on the inside of the carrier 300, and a second portion of the support member 310 may be disposed to be exposed externally from the carrier 300. The support member 310 may be integrally coupled to the carrier 300 by insert injection molding. In this example, the support member 310 may be manufactured to be integrated with the carrier 300 by injecting a resin material into a mold while the support member 310 is fixed in the mold.

The carrier 300 may be made of plastic, and the support member 310 may be made of metal. The support member 310 may be disposed on the carrier 300, thereby improving rigidity of the carrier 300.

The first guide groove 610 that accommodates the ball member B may be disposed in the carrier 300. The first guide groove 610 may be disposed in a surface of the carrier 300 that faces the housing 100 (e.g., a bottom surface of the carrier 300). The first guide groove 610 may include a number of guide grooves corresponding to the number of balls included in the ball member B. In an example, the first guide groove 610 may include three guide grooves.

A seating portion 110 on which the carrier 300 is seated may be disposed on the housing 100. The seating portion 110 may be disposed on an inner surface of the housing 100. In an example, the seating portion 110 may protrude from the inner surface of the housing 100 in a direction perpendicular to the optical axis (Z-axis).

A second guide groove 630 that accommodates the ball member B may be disposed in the housing 100. The second guide groove 630 may be disposed on a surface of the housing 100 facing the carrier 300 (e.g., the seating portion 110 of the housing 100). The second guide groove 630 may include a number of guide grooves corresponding to the number of balls included in the ball member B. In an example, the second guide groove 630 may include three guide grooves.

The first guide groove 610 and the second guide groove 630 may be disposed to oppose each other in the optical axis (Z-axis) direction, and the ball member B may be disposed between the first guide groove 610 and the second guide groove 630.

At least one of the first guide groove 610 and the second guide groove 630 may have a barrier 631 that prevents the ball member B from being separated therefrom. In an example, the barrier 631 that protrudes in the optical axis (Z-axis) direction may each be disposed at the opposite ends of each guide groove included in the second guide groove 630 (see FIG. 7).

Some of the plurality of guide grooves included in the first guide groove 610 may have a shape that is different from a shape of the other guide grooves. In an example, some of the guide grooves may each have an inverted v (Λ)-shaped cross-section, and the other guide grooves may each have an inverted and rotated L (¬)-shaped cross-section. The "some of the guide grooves" may refer to two guide grooves disposed adjacent to each other among the plurality of guide grooves (see FIG. 6).

The plurality of guide grooves included in the second guide groove 630 may have a shape corresponding to each other. In an example, the plurality of guide grooves included in the second guide groove 630 may each have a v-shaped cross-section.

However, the first guide groove 610 and the second guide groove 630 may have the shapes reversed with each other. Alternatively, the second guide groove 630 may also have a shape corresponding to a shape of the first guide groove 610.

The first guide groove 610 and the second guide groove 630 may each have a rounded shape. In an example, the first guide groove 610 and the second guide groove 630 may each have a concave curvature toward the optical axis (Z-axis).

The first guide groove 610 and the second guide groove 630 may each have a rounded shape to correspond to a shape of a circle centered on the optical axis (Z-axis). In an example, the first guide groove 610 and the second guide groove 630 may be each disposed on an arc of the circle centered on the optical axis (Z-axis).

The ball member B may perform a rolling movement between the first guide groove 610 and the second guide groove 630, thereby supporting the rotation of the carrier 300.

Therefore, the carrier 300 may be rotated using the optical axis (Z-axis) as a rotation axis thereof while being supported by the guide unit 600.

A driving unit 400 may provide the carrier 300 with a driving force. The driving unit 400 may be disposed between the carrier 300 and the housing 100. The driving unit 400 may include a magnet 410, a coil 430 and a second substrate 700.

The magnet 410 may be disposed on the carrier 300. In an example, the magnet 410 may be mounted on the support member 310 disposed on the carrier 300. The support member 310 may be made of metal, and the magnet 410 may thus be in close contact with the support member 310 by magnetic force. Additionally, the support member 310 may focus the magnetic force on the magnet 410. Accordingly, it is possible to prevent leakage of magnetic flux. The magnet 410 may include one or more magnets. FIG. 3 illustrates an example in which the magnet 410 includes two magnets.

The coil 430 may be disposed to face the magnet 410. In an example, the magnet 410 and the coil 430 may face each other in the optical axis (Z-axis) direction. The coil 430 may include one or more coils. FIG. 3 illustrates an example in which the coil 430 includes two coils.

The driving unit 400 may further include a frame 450 fixed to the second substrate 700.

The coil 430 may be wound around an outer surface of the frame 450.

A yoke member 470 may be disposed in the frame 450. In an example, a first portion of the yoke member 470 may be disposed in the frame 450, and a second portion of the yoke member 470 may be disposed to be exposed externally from the frame 450. The yoke member 470 may be insert injection molded and integrally coupled to the frame 450. In this example, the yoke member 470 may be manufactured to be integrated with the frame 450 by injecting a resin material into a mold while the yoke member 470 is fixed in the mold.

The frame 450 may be made of plastic, and the yoke member 470 may be made of a magnetic material. The yoke member 470 disposed in the frame 450 may face the magnet 410 in the optical axis (Z-axis) direction.

Therefore, the magnetic force may act between the magnet 410 and the yoke member 470 in the optical axis (Z-axis) direction, and the magnet 410 may thus be pulled toward the yoke member 470. Accordingly, the carrier 300 and the housing 100 may maintain contact with the ball member B.

The yoke member 470 exposed externally from the frame 450 may be coupled to the second substrate 700, and the second substrate 700 may be coupled to the housing 100.

The second substrate 700 may be coupled to the housing 100 to surround at least three of the outer surfaces of the housing 100. The second substrate 700 may be connected to the first substrate 800 which is connected to the image sensor module 250. Accordingly, a connector may be disposed between the second substrate 700 and the first substrate 800.

A portion of the first substrate 800 may extend from an internal space of the housing 100 to an external space of the housing 100, the second substrate 700 may be disposed to surround at least three of the outer surfaces of the housing 100, and the first substrate 800 and the second substrate 700 may be connected to each other on at least one of the at least three outer surfaces of the housing 100.

In an example, the magnet 410 and the coil 430 may be disposed between the plurality of balls included in the ball member B. In an example, when two magnets 410 and two coils 430 are disposed and the ball member B includes three balls, a first pair of a magnet 410 and a coil 430 may be disposed between two adjacent balls, and a second pair of a magnet 410 and a coil 430 may also be disposed between two adjacent balls.

The magnet 410 and the coil 430 may generate a driving force in a direction perpendicular to a direction in which the magnet 410 and the coil 430 face each other. In an example, the magnet 410 and the coil 430 may generate the driving force in the direction perpendicular to the optical axis (Z-axis).

Therefore, the carrier 300 may be rotated using the optical axis (Z-axis) as a rotation axis thereof by the driving force of the magnet 410 and coil 430.

The magnet 410 and the coil 430 may face each other in the optical axis (Z-axis) direction, and may thus have an unchanged relative distance therebetween in the direction of the optical axis (Z-axis) although the carrier 300 is rotated using the optical axis (Z-axis) as a rotation axis thereof. Therefore, it is possible to precisely control a rotational motion of the carrier 300 based on the optical axis (Z-axis).

The lens module 200 may be accommodated in the carrier 300, and the lens module 200 may also be rotated or rotatable together with the carrier 300 as the carrier 300 is rotated.

In an example, the image sensor module 250 may be disposed on the lens module 200, and the image sensor module 250 may also be rotated together with the lens module 200.

The image sensor module 250 may be connected to the first substrate 800, and the first substrate 800 may be made flexible to support the rotation of the image sensor module 250.

When the carrier 300 is rotated using the optical axis (Z-axis) as a rotation axis thereof, the magnet 410 may be a movable member that is rotated together with the carrier 300, and the coil 430 may be a fixed member.

In an example, the magnet 410 may have a rounded shape. For example, the magnet 410 may have an arc shape.

The magnet may have an inner surface (a surface facing a center of the rotation or a surface facing the optical axis (Z-axis)) and an outer surface (a surface opposing the inner surface), each surface having the rounded shape.

An inscribed circle C1 in contact with the inner surface of the magnet 410 and a circumscribed circle C2 in contact with the outer surface of the magnet 410 may be concentric circles.

When the magnet 410 includes two magnets, the inscribed circle C1 in contact with each inner surface of the two magnets and the circumscribed circle C2 in contact with each outer surface of the two magnets may be concentric circles (see FIG. 12).

A position measurement unit may be provided to detect a position of the carrier 300. The position measurement unit may include a sensing magnet 510 and a position sensor 530 (FIG. 3).

The sensing magnet 510 may be disposed on an outer surface of the carrier 300, and the position sensor 530 may be disposed on the second substrate 700 to face the sensing magnet 510. The position sensor 530 may detect the position of the carrier 300 when the carrier 300 is rotated using the optical axis (Z-axis) as a rotation axis thereof.

In a non-limiting example, the position sensor 530 may be a hall sensor.

A passage portion 130 (see FIG. 7), in which a portion of the outer surface of the housing 100 is recessed, may be disposed in the housing 100, and a through-hole 140 that passes through the outer and inner surfaces of the housing 100, may be disposed in a portion of the housing 100 where the passage portion 130 is disposed. The passage portion 130 may be disposed at one corner of the housing 100 (see FIG. 7).

Therefore, a gap between the sensing magnet 510 and the position sensor 530 may be reduced by the through-hole 140, and it may thus be possible to more precisely measure the position of the carrier 300.

In an example, the camera module 10 may include a stopper unit which may limit a rotation range of the carrier 300. The stopper unit may include a protrusion 320 disposed on the outer surface of the carrier 300, and a groove 120 disposed in the inner surface of the housing 100 (see FIG. 9). However, the protrusion 320 and the groove 120 may have positions that are reversed with each other.

The protrusion 320 of the carrier 300 may be disposed in the groove 120 of the housing 100. Therefore, the rotation range of the carrier 300 may be limited by a wall surface of the groove 120 of the housing 100. At least one of the protrusion 320 of the carrier 300 and the wall surface of the groove 120 of the housing 100 may have a cushioning member made of an elastic material. Therefore, it is possible to cushion any impacts, and reduce noise when the carrier 300 and the housing 100 collide with each other.

Figure 15:
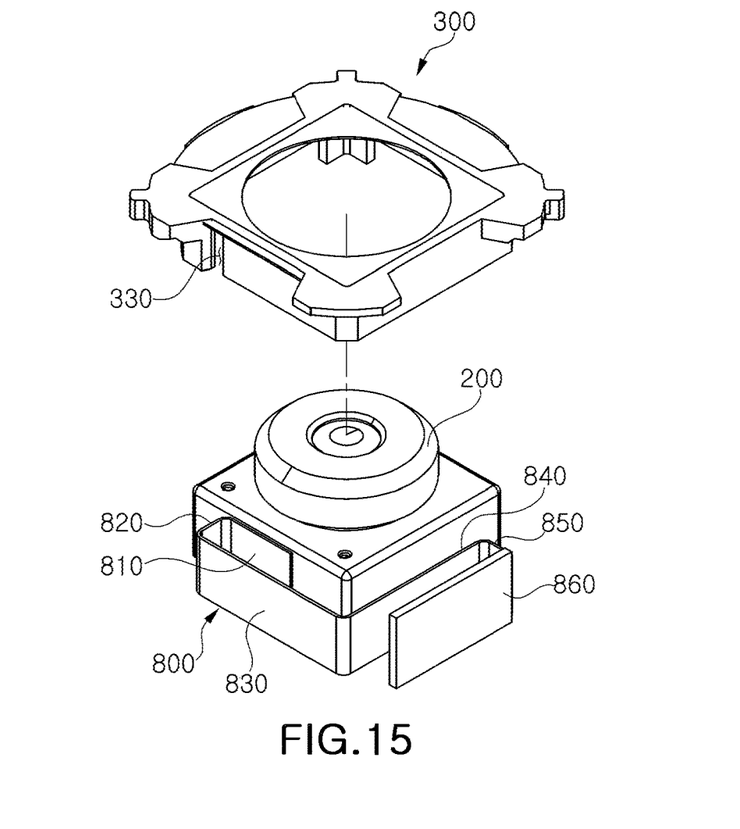
FIG. 15 is an exploded perspective view of an example lens module and an example carrier, in accordance with one or more embodiments.
Figure 16:
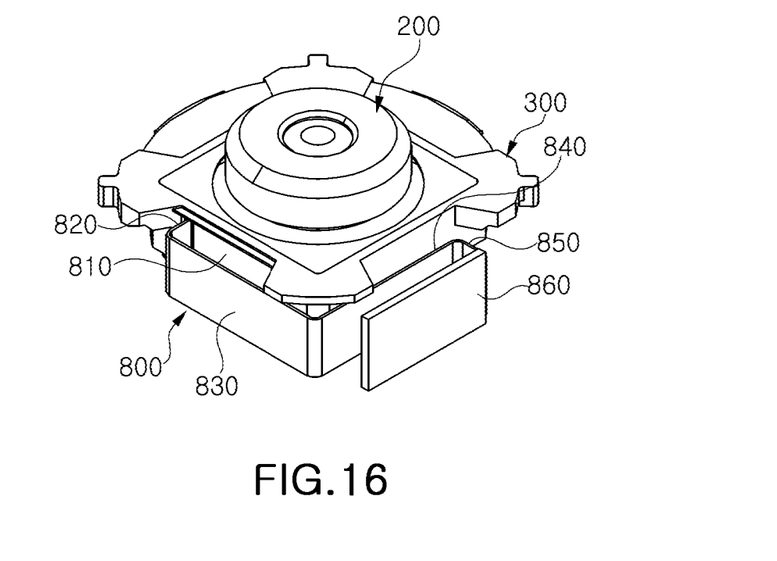
FIG. 16 is a view illustrating an example in which the lens module and the carrier are coupled to each other.

FIG. 15 is an exploded perspective view of the example lens module and the example carrier, in accordance with one or more embodiments; and FIG. 16 illustrates an example in which the lens module and the carrier are coupled to each other.

Figure 17:
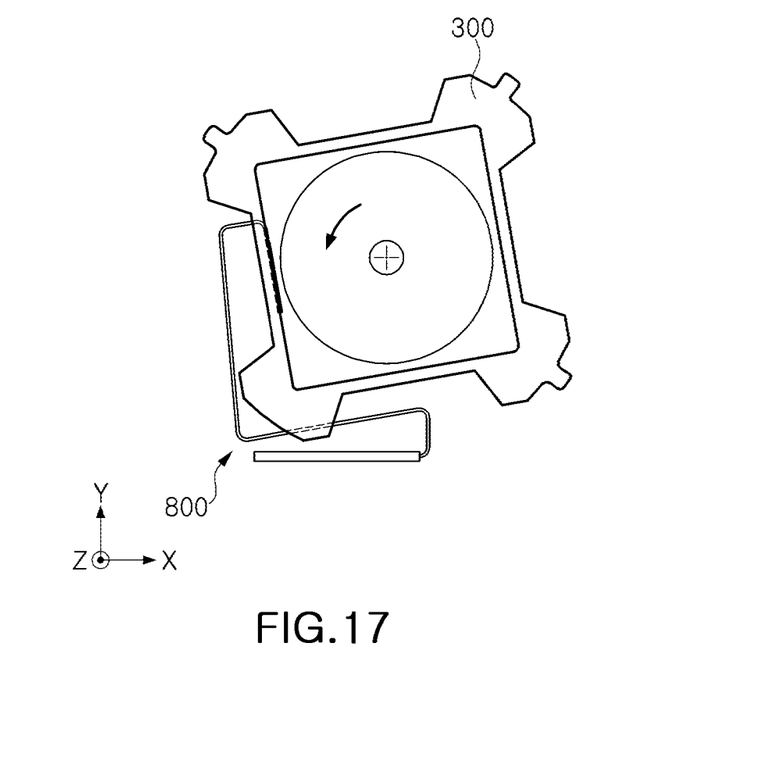
FIGS. 17 and 18 are views schematically illustrating a state in which a first substrate connected to the lens module is moved when the lens module and the carrier are rotated.
Figure 18:
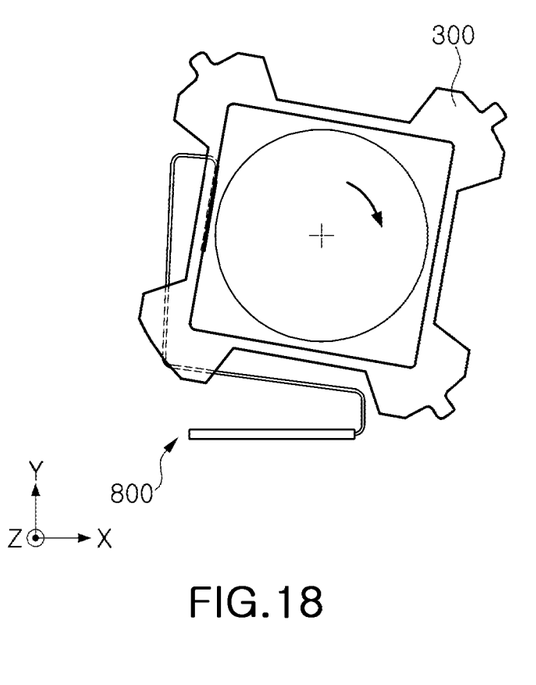

Additionally, FIGS. 17 and 18 schematically illustrate an example in which a first substrate connected to the lens module is moved when the lens module and the carrier are rotated.

Referring to FIGS. 15 through 18, the first substrate 800 may be connected to the lens module 200. The first substrate 800 may have a first side connected to the lens module 200 (image sensor module 250), and a second side connected to the second substrate 700.

In an example, the second side of the first substrate 800 may also be coupled to the housing 100. The portion of the first substrate 800 connected to the lens module 200 may be a movable member that rotates together with the lens module 200, and a portion thereof connected to the housing 100 may be a fixed member.

The second substrate 700 and the first substrate 800 may be electrically connected to the connection substrate 900 disposed on the bottom of the housing 100.

The at least one portion of the first substrate 800 may be made flexible to support the rotation of the lens module 200. In an example, the first substrate 800 may be a flexible circuit board and have a curved shape. In an example, the first substrate 800 may be bent.

The first substrate 800 may have a shape of a flexible film on which a conductor is patterned or a shape in which a plurality of cables extend. Therefore, when the lens module 200 and the carrier 300 are rotated together, the first substrate 800 may be bent.

The first substrate 800 may be disposed to extend from an internal space of the carrier 300 to a space between the housing 100 and the carrier 300, and disposed to extend from the space between the housing 100 and the carrier 300 to the external space of the housing 100.

The first substrate 800 may include a first connection portion 810, a first extension portion 820, a second extension portion 830, a third extension portion 840, a fourth extension portion 850 and a second connection portion 860. In an example, the first substrate 800 may be bent at least three times.

The first connection portion 810 may be connected to the lens module 200. In an example, the first connection portion 810 may be connected to the image sensor module 250 of the lens module 200. Therefore, the first connection portion 810 may be disposed in the internal space of the carrier 300.

The second connection portion 860 may be coupled to the outer surface of the housing 100. Therefore, the second connection portion 860 may be disposed in the external space of the housing 100, and connected to the second substrate 700.

The first extension portion 820 may extend from the first connection portion 810. In an example, the first extension portion 820 may extend from the internal space of the carrier 300 to the external space of the carrier 300.

A first through groove 330 may be disposed in one surface of the carrier 300. The first through groove 330 may pass through the inner and outer surfaces of the carrier 300, and may be open to the bottom of the carrier 300. The first through groove 330 may be disposed to be biased to one side from the one surface of the carrier 300. For example, the first through groove 330 may be disposed to be biased from the one surface of the carrier 300 in a direction opposite to a direction in which the second extension portion 830 extends.

The first extension portion 820 may extend from the internal space of the carrier 300 to the external space of the carrier 300 by passing through the first through groove 330. The first extension portion 820 may be bent and extend from the first connection portion 810.

The second extension portion 830 may be bent and extend from the first extension portion 820. For example, the second extension portion 830 may be bent from the first extension portion 820 and extend along one outer surface of the carrier 300. A length of the second extension portion 830 may be longer than a length from the first through groove 330 to an end of the one surface of the carrier 300 in the direction in which the second extension portion 830 extends.

The third extension portion 840 may be bent and extend from the second extension portion 830. For example, the third extension portion 840 may be bent from the second extension portion 830 and extend along another outer surface of the carrier 300.

The fourth extension portion 850 may extend from the third extension portion 840. For example, the fourth extension portion 850 may extend from the internal space of the housing 100 to the external space of the housing 100.

A second through groove 150 may be disposed in one surface of the housing 100 (see FIG. 7). The second through groove 150 may pass through the inner and outer surfaces of the housing 100, and may be open to the bottom of the housing 100. The second through groove 150 may be disposed to be biased to one side from the one surface of the housing 100. For example, the second through groove 150 may be disposed to be biased from the one surface of the housing 100 in a direction in which the third extension portion 840 extends.

In an example, a length of the third extension portion 840 may be longer than a length from one end of the another surface of the carrier 300 to its other end corresponding to the second through groove 150 of housing 100 in the direction in which the third extension portion 840 extends.

The fourth extension portion 850 may extend from the internal space of the housing 100 to the external space of the housing 100 by passing through the second through groove

150. The fourth extension portion 850 may be bent and extend from the third extension portion 840.

The second connection portion 860 may be bent from the fourth extension portion 850 and extend along the outer surface of the housing 100. The second connection portion 860 may be connected to the second substrate 700.

As described above, the first substrate 800 may be made to be flexible, and thus be bent when the lens module 200 and the carrier 300 are rotated together as shown in FIGS. 17 and 18, thereby stably transmitting the image signal to the portable electronic device 1.

As set forth above, the camera module according to an example may stabilize the optical image.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
   a lens module comprising an image sensor module;
   a carrier, coupled to the lens module, configured to rotate the lens module and the image sensor module using an optical axis as a rotation axis;
   a housing, configured to accommodate and support the carrier;
   a guide unit, disposed between the carrier and the housing, wherein the guide unit includes a ball member that is configured to perform a rolling movement between the carrier and the housing; and
   a first substrate having a curved shape, and at least a portion of the first substrate is configured to bend as the carrier is rotated,
   wherein the first substrate is spaced apart from the lens module in a direction perpendicular to the optical axis including lens module, and
   wherein the first substrate comprises a first connection portion disposed in an internal space of the carrier and connected to the image sensor module, and a second connection portion disposed in an external space of the housing.

2. The camera module of claim 1, wherein the guide unit further comprises a first guide groove disposed in the carrier, and a second guide groove disposed in the housing, and the ball member is disposed between the first guide groove and the second guide groove, and
   wherein at least one of the first guide groove and the second guide groove has a rounded shape and has a length in a rotation direction of the carrier using the optical axis as a rotation axis.

3. The camera module of claim 2, wherein a plurality of guide units are provided, and the plurality of guide units are disposed on an arc of a circle centered on the optical axis.

4. The camera module of claim 2, wherein at least one of the first guide groove and the second guide groove comprises a barrier that protrudes from each of opposite ends of the at least one of the first guide groove and the second guide groove.

5. The camera module of claim 1, wherein a protrusion is disposed on one of the carrier and the housing, a groove in which the protrusion is disposed is disposed in the other of the carrier and the housing, and a rotation range of the carrier is limited by the protrusion and the groove.

6. The camera module of claim 1, further comprising a driving unit, configured to provide a driving force to the carrier,
   wherein the driving unit comprises a magnet disposed on the carrier, a coil configured to face the magnet in an optical axis direction, and a second substrate on which the coil is disposed and which is fixed to the housing.

7. The camera module of claim 6, wherein the magnet is configured to have an inner surface that faces the optical axis, and an outer surface opposing the inner surface, each surface having a rounded shape.

8. The camera module of claim 7, wherein an inscribed circle in contact with the inner surface of the magnet and a circumscribed circle in contact with the outer surface of the magnet are concentric circles.

9. The camera module of claim 6, wherein the driving unit further comprises a frame fixed to the second substrate, and the coil is wound around the frame.

10. The camera module of claim 9, wherein a yoke member composed of a magnetic material is disposed in the frame,
    wherein a first portion of the yoke member is disposed in the frame, and a second portion of the yoke member is disposed to be exposed externally from the frame, and
    wherein the magnet and the yoke member are configured to face each other in the optical axis direction.

11. The camera module of claim 1, wherein a sensing magnet is disposed on the carrier, and a position sensor that is configured to face the sensing magnet is disposed in the housing.

12. The camera module of claim 1, wherein a portion of the first substrate extends from an internal space of the housing to an external space of the housing,
    wherein a second substrate is disposed to surround at least three of outer surfaces of the housing, and
    wherein the first substrate and the second substrate are connected to each other on one of the at least three outer surfaces of the housing.

13. The camera module of claim 1, wherein a support member composed of a metal is disposed on the carrier, and
    wherein a first portion of the support member is disposed on an inner surface of the carrier, and a second portion of the support member is disposed to be exposed externally from the carrier.

14. The camera module of claim 1, wherein the lens module comprises a lens portion, a base configured to accommodate the lens portion, and the image sensor module coupled to the base, and
    wherein the first substrate is configured to have a first side connected to the image sensor module and a second side coupled to the housing.

15. The camera module of claim 14, wherein the first substrate is disposed to extend from an internal space of the carrier to a space between the housing and the carrier, and is disposed to extend from the space between the housing and the carrier to an external space of the housing.

16. The camera module of claim 15, wherein a first through groove is disposed in the carrier, and the first substrate extends from the internal space of the carrier to the space between the housing and the carrier through the first through groove, and wherein a second through groove is disposed in the housing, and the first substrate is configured to extend from the space between the housing and the carrier to the external space of the housing through the second through groove.

17. The camera module of claim 1, wherein a connection substrate is disposed on a bottom of the housing, and wherein the first substrate is electrically connected to the connection substrate.

18. The camera module of claim 1, wherein the lens module further comprises a lens portion including a plurality of lenses.

19. An electronic device, comprising:

a camera module, comprising:
a housing;
a carrier, disposed in the housing, and configured to rotate relative to the housing;
a guide unit, disposed between the carrier and the housing, wherein the guide unit includes a ball member that is configured to perform a rolling movement between the carrier and the housing;
a lens module, comprising an image sensor module, coupled to the carrier and configured to rotate with the carrier using an optical axis as a rotation axis; and
a first substrate, connected to the lens module, comprising a first connection portion disposed in an internal space of the carrier and connected to the image sensor module, and a second connection portion disposed in an external space of the housing,
wherein at least a portion of the first substrate is configured to bend as the carrier is rotated, and
wherein the first substrate is spaced apart from the lens module in a direction perpendicular to the optical axis including lens module.

20. The electronic device of claim 19, wherein the first substrate is configured to externally transmit a signal from an image sensor module connected to the lens module.

* * * * *